US008456768B2

(12) United States Patent
Shih et al.

(10) Patent No.: US 8,456,768 B2
(45) Date of Patent: Jun. 4, 2013

(54) LENS-HOLDING-AND-ALIGNING SEAT AND LED LIGHT PANEL THEREOF

(75) Inventors: Chin-Ming Shih, Hsinchu (TW); Yeu-Torng Yau, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 299 days.

(21) Appl. No.: 13/010,651

(22) Filed: Jan. 20, 2011

(65) Prior Publication Data

US 2012/0127730 A1 May 24, 2012

(30) Foreign Application Priority Data

Nov. 23, 2010 (TW) ............................... 99140406 A

(51) Int. Cl.
*G02B 7/02* (2006.01)

(52) U.S. Cl.
USPC ...... 359/819; 359/818; 359/830; 362/311.12; 362/455; 362/456; 362/249.02

(58) Field of Classification Search
USPC ............... 362/311.02, 311.12, 367, 455–456, 362/800, 257, 268, 296.1, 612, 555, 249.02; 359/818–819, 812, 830
See application file for complete search history.

(56) References Cited

U.S. PATENT DOCUMENTS

| | | | | |
|---|---|---|---|---|
| 4,600,970 | A | 7/1986 | Bauer | |
| 5,249,733 | A | 10/1993 | Brady et al. | |
| 5,617,131 | A * | 4/1997 | Murano et al. | 347/233 |
| 5,661,831 | A | 8/1997 | Sasaki et al. | |
| 5,998,875 | A | 12/1999 | Bodo et al. | |
| 6,313,999 | B1 | 11/2001 | Fratti et al. | |
| 6,480,651 | B1 | 11/2002 | Rabinski | |
| 6,904,672 | B2 | 6/2005 | Nagafuku et al. | |

(Continued)

FOREIGN PATENT DOCUMENTS

| | | |
|---|---|---|
| CN | 201225597 Y | 4/2009 |
| TW | 481387 Y | 3/2002 |

(Continued)

OTHER PUBLICATIONS

Chen et al., Analyzing the Mechanical Strength of SMT Attached Solder Joints, IEEE Transactions on Components, Hybrids, and Manufactureing Technology, 1990, pp. 553-558, vol. 13, No. 3.

(Continued)

*Primary Examiner* — Anne Hines
*Assistant Examiner* — Jose M Diaz
(74) *Attorney, Agent, or Firm* — Morris Manning & Martin LLP; Tim Tingkang Xia, Esq.

(57) ABSTRACT

A lens-holding-and-aligning seat and an LED light panel thereof are presented. The light panel includes a substrate, an LED, a lens and a holding-and-aligning seat. The LED is disposed on the substrate in corresponding to a soldering pad of the substrate, and the holding-and-aligning seat has a holding portion and an aligning element. The lens is fixed on the holding-and-aligning seat by the holding portion, and the aligning element is bonded on the soldering pad corresponding to the soldering pad by a reflow process. Therefore, the lens is aligned with the LED by a soldering self-alignment mechanism, such that the light shape and light intensity distribution of the light emitted by the LED may be adjusted by the lens.

16 Claims, 5 Drawing Sheets

U.S. PATENT DOCUMENTS

| | | | | |
|---|---|---|---|---|
| 7,087,991 | B2 | 8/2006 | Chen et al. | |
| 7,766,509 | B1 * | 8/2010 | Laporte | 362/249.02 |
| 7,976,194 | B2 * | 7/2011 | Wilcox et al. | 362/268 |
| 8,002,435 | B2 * | 8/2011 | Laporte | 362/249.02 |
| 8,061,868 | B2 * | 11/2011 | Dubord | 362/232 |
| 8,083,380 | B2 * | 12/2011 | Zhou | 362/311.02 |
| 8,287,150 | B2 * | 10/2012 | Schaefer et al. | 362/249.02 |
| 2005/0179041 | A1 * | 8/2005 | Harbers et al. | 257/80 |
| 2006/0139918 | A1 * | 6/2006 | Dolgin et al. | 362/232 |
| 2007/0098334 | A1 * | 5/2007 | Chen | 385/92 |
| 2007/0201225 | A1 * | 8/2007 | Holder et al. | 362/227 |
| 2008/0273327 | A1 * | 11/2008 | Wilcox et al. | 362/267 |
| 2008/0278941 | A1 * | 11/2008 | Logan et al. | 362/234 |
| 2009/0298376 | A1 * | 12/2009 | Guillien et al. | 445/43 |
| 2010/0002450 | A1 * | 1/2010 | Pachler et al. | 362/311.02 |
| 2010/0014304 | A1 * | 1/2010 | Frey et al. | 362/507 |
| 2010/0118550 | A1 * | 5/2010 | Kuo | 362/311.02 |
| 2011/0103051 | A1 * | 5/2011 | Wilcox et al. | 362/235 |

FOREIGN PATENT DOCUMENTS

| | | | |
|---|---|---|---|
| TW | 571412 | B | 1/2004 |
| TW | 200522395 | | 7/2005 |
| TW | M303325 | U | 12/2006 |
| TW | I285305 | B | 8/2007 |
| TW | I294404 | Y | 3/2008 |
| TW | 200905428 | | 2/2009 |

OTHER PUBLICATIONS

Zhang et al., Design of Solder Joint for Self-Alignment in Optical Fiber Attachment Soldering, ICEPT 2007. 8th International Conference on Electronic Packaging Technology, Issue Date: Aug. 14-17, 2007, pp. 1-5, Shanghai, ISBN: 978-1-4244-1392-8.

Rusander et al., Equipment for placement and bonding, The First IEEE International Symposium on Polymeric Electronics Packaging, 1997. Proceedings., 1997, pp. 259-264, Norrkoping , Sweden , Print ISBN: 0-7803-3865-0.

Krammer et al., Studying the Dynamic Behaviour of Chip Components during Reflow Soldering, 30th International Spring Seminar on Electronics Technology, 2007, pp. 18-23, Cluj-Napoca, rint ISBN: 987-1-4244-1218-1.

Patra, et al., Modeling of self-alignment mechanism in flip-chip soldering. II. Multichip solder joints, Electronic Components and Technology Conference, 1991. Proceedings., 41st, 1991, pp. 783-788, Atlanta, GA , USA, Print ISBN: 0-7803-0012-2.

Intellectual Property Office, Ministry of Economic Affairs, R.O.C., “Office Action”, Mar. 29, 2013, Taiwan.

State Intellectual Property Office of the People’s Republic of China, “Office Action”, Mar. 25, 2013, China.

* cited by examiner

LENS-HOLDING-AND-ALIGNING SEAT AND LED LIGHT PANEL THEREOF

CROSS-REFERENCE TO RELATED APPLICATIONS

This non-provisional application claims priority under 35 U.S.C. §119(a) on Patent Application No(s). 099140406 filed in Taiwan, R.O.C. on Nov. 23, 2010, the entire contents of which are hereby incorporated by reference.

BACKGROUND

1. Field

The present disclosure relates to a lens holding-and-aligning seat and an LED light panel thereof, in particular relates to an aligning seat capable of aligning with the LED by a reflow soldering self-alignment mechanism and a light panel thereof.

2. Related Art

An LED (Light Emitting Diode) has the advantages of power saving and environmental friendly, so the application of the LED is developed from the low-power indicator and display to the high-power illumination field. In the application field of high-power illumination, the LED needs to satisfy the basic requirement of high illumination and additionally the light emitted by the LED lamp must meet a certain illumination requirement. For example, when the LED lamp is applied in the street light, the light intensity distribution must conform to the illumination specification of the street light. Also, when the LED is applied in the head light, the LED heat light must conform to the light shape and intensity specification of the heat light. In addition, in certain low-power applications of the LED, the entire light shape and intensity distribution have specific requirements.

Normally, the LED satisfies the requirements of the light shape and intensity distribution by the design of lens. A part of the design adopts a primary optical architecture and other design adopts a secondary optical architecture. The primary optical architecture refers to directly forming a lens on an LED chip to control the light before the light emitted by the LED chip enters the air. The secondary optical architecture refers to disposing a lens on a light path of the light emitted by the LED chip (normally after the light enters the air) to control the light.

The lens adopted in the secondary optical architecture is generally clamped by a lens holder and the lens holder is fixed on a circuit board in a tight fit, gluing or screw locking manner, and thus the lens is aligned with the LED on the circuit board and controls the light emitted by the LED. Since the alignment between the lens and the LED is maintained by the fixing relation of the lens holder and the circuit board, if the tight fit or screw locking state changes, the overall light shape and intensity distribution are obviously affected.

In regard with the fixing manner of tight fit, normally, several fixing pins on the lens holder are inserted in the holes of the circuit board. Because it is the tight fit (interference fit), an enough force must be exerted to insert the fixing pins in the holes while fitting, if the force is uneven or the dimension relation of the fixing pins and the holes is improper, the alignment is not accurate, which further influences the light shape. Then, since the LED may generate heat in operation, the aperture of the tight fit is usually expanded under the heat, and thus the stable state of the tight fit is changed, which further influences the light shape and intensity distribution.

In regard with the aforementioned gluing and screw locking manners, the processing steps and time must be increased, and in mass production, the alignment effect of the individuals is hard to keep consistent.

Accordingly, the present disclosure provides a lens-holding-and-aligning seat and an LED light panel thereof, which has a precise positioning in the processes thereby solving the above problems.

According to an embodiment, the LED light panel includes a substrate, an LED, a lens and a holding-and-aligning seat. The substrate has a plurality of soldering pads, the LED is disposed on the substrate corresponding to the soldering pad, and the holding-and-aligning seat has a holding portion and a plurality of aligning elements. The holding portion clamps the lens, the aligning elements are soldered on the soldering pads correspondingly by a reflow process, such that the lens corresponds to the LED, and the light shape and light intensity distribution of the light emitted by the LED are adjusted by the lens.

In another embodiment, a surface area of each soldering pad is 1 to 5 times of a bottom area of a corresponding aligning element, and preferably is 1.2 to 5 times.

In an embodiment, the holding-and-aligning seat has a plurality of positioning holes, the aligning elements is disposed on the positioning holes, a difference between a bottom area of each positioning hole and a bottom area of the corresponding aligning element is smaller than or equal to a difference between the bottom area of the aligning element and the area of the soldering pad corresponding to the aligning element.

In an embodiment, the bottom of the holding-and-aligning seat has a plurality of bumps, the substrate has at least a plane corresponding to the bumps, and when the holding-and-aligning seat is fixed on the substrate, one of the bumps touches the plane.

According to an embodiment, the lens-holding-and-aligning seat is applicable to clamping a lens and aligning the lens with an LED on a substrate. The substrate has a plurality of soldering pads. The lens-holding-and-aligning seat includes a body having a holding portion and a plurality of aligning elements. The holding portion clamps the lens, the aligning elements correspond to the soldering pads, such that the lens corresponds to the LED and a surface area of each soldering pad is 2 to 4 times of the bottom area of the corresponding aligning element.

Based on the above characteristics of this disclosure, according to the SMT (Surface-Mount Technology) of the substrate, a solder is firstly coated on the soldering pad by solder printing, then the holding-and-aligning seat (including the aligning element) and the LED are disposed at the proper position (here, mounting, pick and place), such that the aligning element preliminarily corresponds to the soldering pad. Then, the entire substrate, the LED and the holding-and-aligning seat are subjected to a reflow process (or referred to as the Flow Convection Oven), such that the aligning element is bonded on the soldering pad. Because (1) the relative position of the aligning element and the holding-and-aligning seat is determined when designing, (2) the relative position of the LED and the soldering pad is determined on the substrate, and (3) in the reflow process, the aligning element can be precisely aligned on the soldering pad under a binding force and surface tension of the melted solder, the relative position of the lens and the LED is fixed, thereby achieving the purpose of precise positioning.

According to the aforementioned characteristics, the proper design of the bottom area of the aligning element and the surface area of the soldering pad can improve the precision. Further, in another embodiment, when the aligning element and the holding-and-aligning seat do not adopt the tight fit design, the dimension relation between the positioning hole and the aligning element when properly designed may achieve a more precise positioning effect.

It is to be understood that both the foregoing general description and the following detailed description are by examples, and are intended to provide further explanation of the disclosure as claimed.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
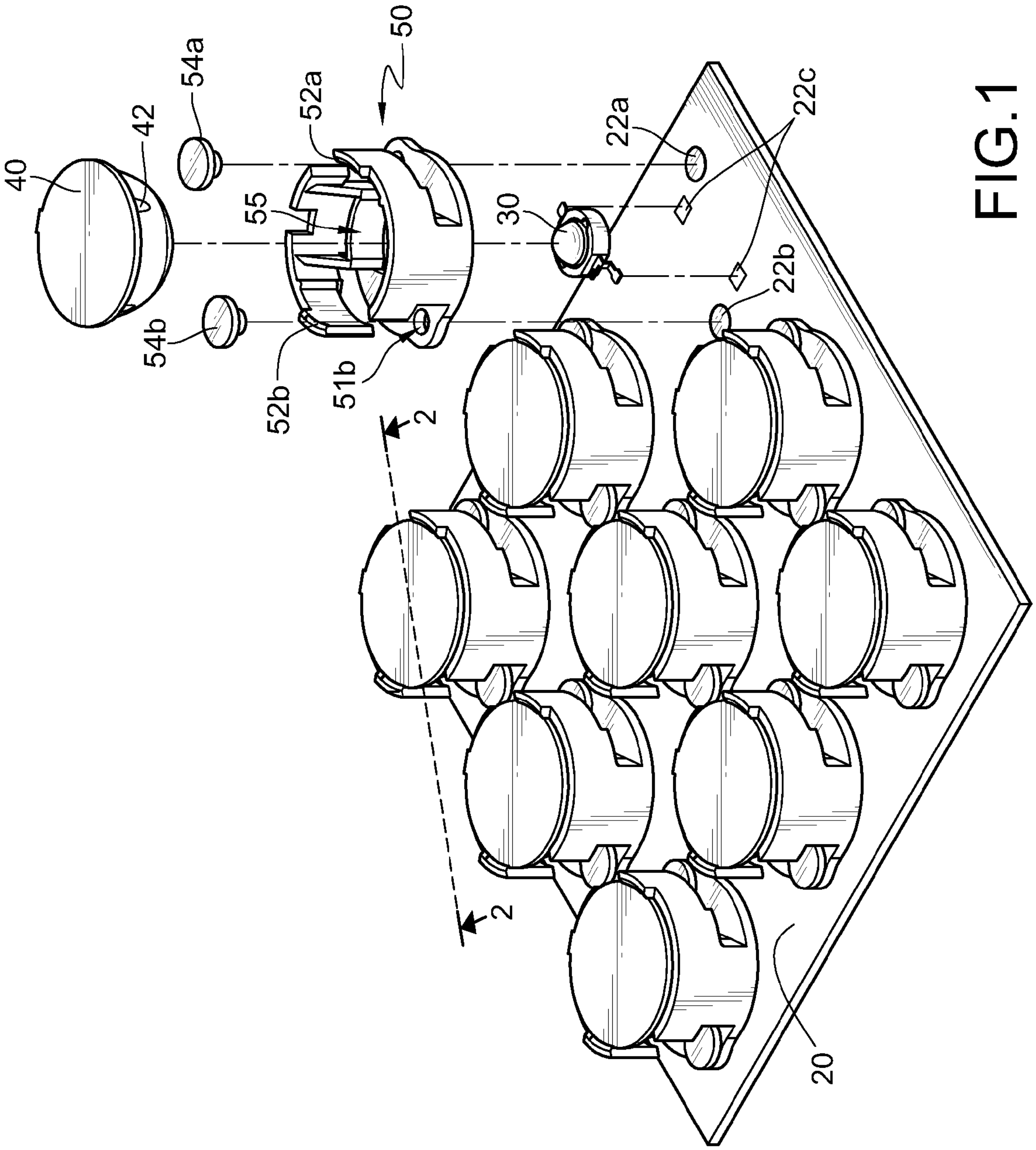
FIG. 1 is a schematic structural view of an LED light panel according to an embodiment of the present disclosure.

FIG. 1 is a schematic structural view of an LED light panel according to this disclosure. Referring to FIG. 1, the LED light panel includes a substrate 20, an LED 30, a lens 40 (also referred to as an optical lens) and a holding-and-aligning seat 50. The substrate 20 may be but not limited to a PCB board (Printing Circuit Board) or another substrate that can be used in the reflow process.

The substrate 20 has a plurality of soldering pads 22*a*, 22*b*. The number of the soldering pads 22*a*, 22*b* is for example but not limited to two, and may also be three or more. Definitely, the substrate 20 also has a soldering pad 22*c* for bonding the LED 30 at the position corresponding to the LED 30. For the convenience of illustration, the soldering pads 22*a*, 22*b* are referred to as the first soldering pads 22*a*, 22*b*, and the soldering pad 22*c* is referred to as the second soldering pad 22*c*. The relative position between the first soldering pads 22*a*, 22*b* and the second soldering pad 22*c* is fixed when designed, so as to facilitate the subsequent alignment.

The LED 30 is disposed on the second soldering pad 22*c* on the substrate 20 so as to preliminarily fix the relative position. Since the second soldering pad 22*c* corresponds to the first soldering pads 22*a*, 22*b*, the relative position of the LED 30 and the first soldering pads 22*a*, 22*b* is also fixed. The LED 30 after excited (or powered) may emit the light. The LED 30 may also have a surface lens on the surface thereof so as to make the primary optical adjustment on the light.

The holding-and-aligning seat 50 has holding portions 52*a*, 52*b* and a plurality of aligning elements 54*a*, 54*b*. The holding portions 52*a*, 52*b* clamp the lens 40, and the aligning elements 54*a*, 54*b* respectively correspond to the first soldering pads 22*a*, 22*b* and are soldered (described in details in the following contents) on the first soldering pads 22*a*, 22*b* in a reflow process, such that the lens 40 corresponds to the LED 30 and the light shape and light intensity distribution of the light emitted by the LED 30 are adjusted by the lens 40 (i.e. the secondary optical adjustment).

Figure 2:
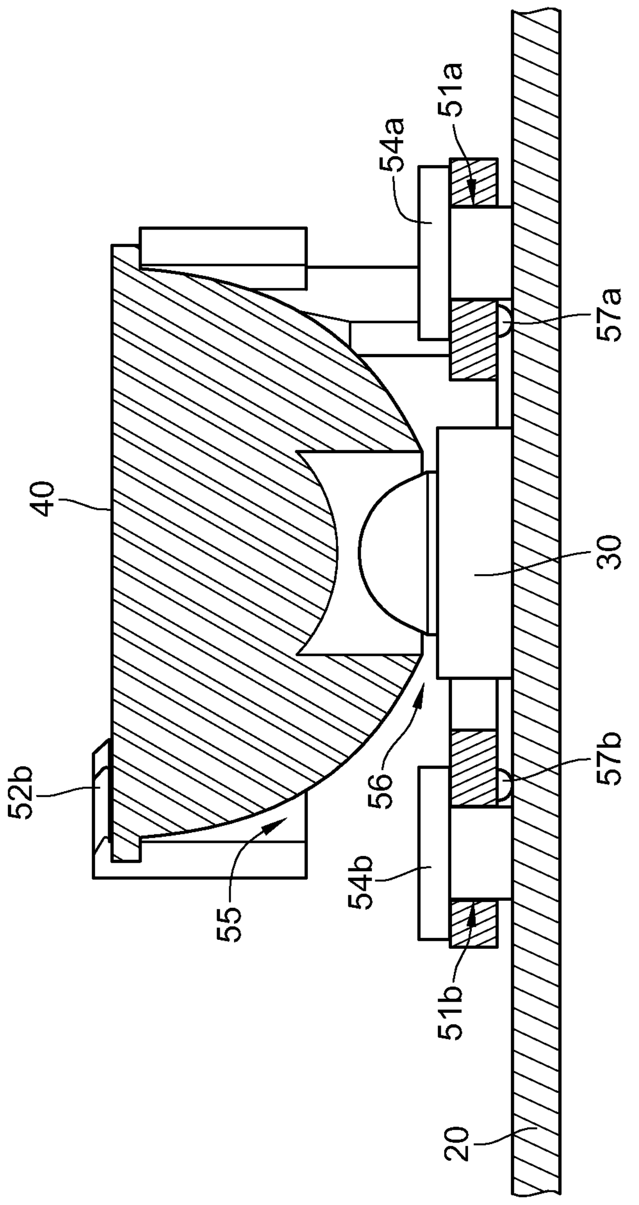
FIG. 2 is a schematic partial cross-sectional view of 2-2 position in FIG. 1.

FIG. 2 is a schematic partial cross-sectional view of 2-2 position in FIG. 1. Referring to FIG. 2, the lens 40 is clamped by the holding-and-aligning seat 50, the LED 30 is bonded on the second soldering pad 22*c*, and the aligning elements 54*a*, 54*b* are bonded on the first soldering pads 22*a*, 22*b*.

The holding-and-aligning seat 50 has an accommodation space 55 and a passage 56. The accommodation space 55 is used to accommodate the lens 40. The passage 56 communicates the accommodation space 55 and the LED 30, such that at least a part of the light emitted by the LED 30 is incident on the lens 40 after passing the passage 56 and the accommodation space 55. The lens 40 properly adjust the light incident on the lens 40, and thus the expected light shape and light intensity distribution are obtained. The holding portions 52*a*, 52*b* adopt the rib design in this embodiment, but the holding portions 52*a*, 52*b* are not limited to this and may adopt any structure that allows the holding-and-aligning seat 50 to clamp the lens 40.

Furthermore, to dispose the lens 40 at a proper angle on the holding-and-aligning seat 50, the lens 40 further has an alignment emboss 42, and the holding-and-aligning seat 50 additionally has a slot at the position corresponding to the alignment emboss 42 so as to accommodate the alignment emboss 42 thereby preventing the lens 40 disposed in undesired orientation.

Figure 3:
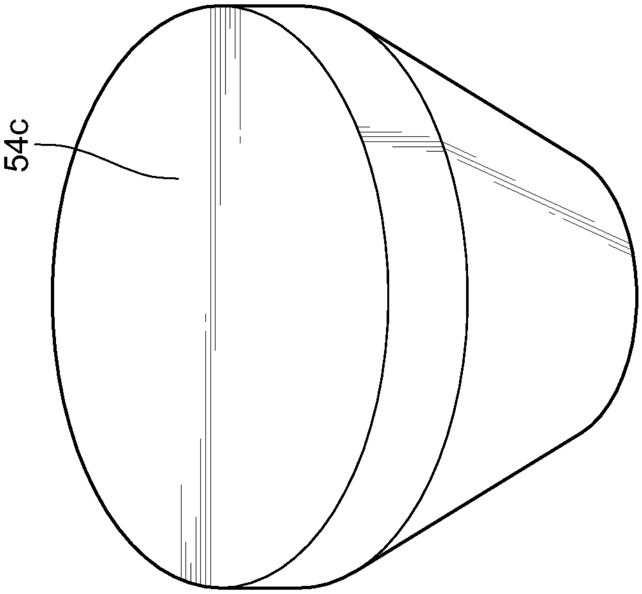
FIG. 3 is a schematic structural view of an aligning element according to another embodiment of the present disclosure.

In this embodiment, the aligning elements 54*a*, 54*b* are for example but not limited to stepped cylinders and the bottom area of the stepped cylinder is smaller than the top area of the stepped cylinder. The aligning elements 54*a*, 54*b* are tapered element 54*c* as shown in FIG. 3 and the tapered element 54*c* extends outwards in a conic shape upwardly from the bottom. In addition, the aligning elements 54*a*, 54*b* may also be aligning elements with square or rectangular cross-section (bottom area). The material of the aligning elements 54*a*, 54*b* may be any material that can be bonded on the substrate by the reflow process, which includes but not limited to a Ni-plated metal, gold, silver, copper and nickel etc.

In this embodiment, for example, a diameter of each first soldering pad 22*a*, 22*b* (i.e. the diameter of the round surface for soldering) is 1 to 5 times of a diameter of the bottom (the bottom to be soldered with the soldering pad) of the corresponding aligning elements 54*a*, 54*b*. In other embodiment, the surface area of each soldering pad 22*a*, 22*b* is 1.2 to 5 times of the bottom area of the corresponding aligning element 54*a*, 54*b*. More specifically, the surface area of the first soldering pad 22*a* is 1.2 to 5 times of the bottom area of the corresponding aligning element 54*a*. The surface area of the first soldering pad 22*b* is 1.2 to 5 times of the bottom area of the corresponding aligning element 54*b*.

Based on the above, the assembly of the LED light panel and the bonding procedures may be but not limited to the following procedures.

Firstly, according to the SMT technology of the substrate 20, a soldering material is coated on the soldering pads 22*a*, 22*b*, 22*c* by solder printing, and soldering material may be but not limited to a solder paste or flux.

Then, the holding-and-aligning seat 50 (including the aligning elements 54*a*, 54*b*) and the LED 30 are respectively disposed on the first soldering pads 22*a*, 22*b* and the second soldering pad 22*c* by mounting, pick and place technologies, so that the aligning element preliminarily corresponds to the soldering pad. Then, the entire substrate 20, the LED 30 and the holding-and-aligning seat 50 go through the reflow process (or referred to as the Flow Convection Oven) to bond the aligning elements 54*a*, 54*b* and LED 30 on the first soldering pads 22*a*, 22*b* and the second soldering pad 22*c*. Since the soldering material is melted in the early stage of the reflow process, the aligning elements 54*a*, 54*b* and LED 30 are respectively precisely bonded on the first soldering pads 22*a*, 22*b* and the second soldering pad 22*c* under a binding force and surface tension of the melted soldering material, which is referred to as the soldering self-alignment mechanism.

Then, the proper design of the bottom area of the aligning elements 54*a*, 54*b* and the surface area of the first soldering pads 22*a*, 22*b*, the aligning elements 54*a*, 54*b* may be aligned with the first soldering pads 22*a*, 22*b* in a more precise way, such that the lens 40 may be precisely aligned with the LED 30.

In this embodiment, the holding-and-aligning seat 50 further has positioning holes 51*a*, 51*b* for the aligning elements 54*a*,54*b* to be placed therein. To ensure that the soldering self-alignment mechanism will not be influenced by the dimensional difference between the positioning holes 51*a*, 51*b* and the aligning elements 54*a*, 54*b*, the dimensional difference between the bottom area (or referred to as the aperture) of each positioning hole 51*a*, 51*b* and the outer diameter of the corresponding aligning elements 54*a*, 54*b* is smaller than or equal to a dimensional difference between the outer diameter of the aligning elements 54*a*, 54*b* and the outer diameter of the soldering pads 22*a*, 22*b* corresponding to the aligning elements 54*a*, 54*b* (the first pads).

The above dimensional difference is the difference between diameters of the aligning elements 54*a*, 54*b* and the positioning holes 51*a*, 51*b* when the aligning elements 54*a*, 54*b* are conic column, as shown in FIG. 3, after the aligning elements 54*a*, 54*b* are bonded on the substrate 20. Furthermore, if the aligning elements 54*a*, 54*b* have non-circular cross-section, i.e. have the square or rectangular cross-section, the above dimensional difference is the difference between the lengths or widths of the cross-section of the aligning elements 54*a*, 54*b* and the soldering pads 22*a*, 22*b*.

In an embodiment, the holding-and-aligning seat 50 has bumps 57*a*, 57*b* (or called as projections or protrusions) on the side facing the substrate 20, and one of the bumps 57*a*, 57*b* touches the surface of the substrate 20. The bumps 57*a*, 57*b* may reduce the friction between the holding-and-aligning seat 50 and the substrate 20, that is to say, when the aligning elements 54*a*, 54*b* are automatically aligned with the first soldering pads 22*a*, 22*b* in the reflow process, the soldering material drives the holding-and-aligning seat 50 to shift on the surface of the substrate 20 under the binding force and surface tension. Due to the placing of the bumps 57*a*, 57*b*, a point touch, line touch, or small area face touch can be formed between the holding-and-aligning seat 50 and the substrate 20, such that it is easy to achieve the expected alignment effect of the aligning elements 54*a*, 54*b* and the first soldering pads 22*a*, 22*b*. Furthermore, the surface of the substrate 20 corresponding to the bumps 57*a*, 57*b* may be designed to be a low friction surface, which is for example but not limited to a metal surface to reduce the friction between the holding-and-aligning seat 50 and the substrate 20.

In this embodiment, each holding-and-aligning seat 50 clamps a single lens 40, which is not intended to limit the scope of the present disclosure. Each holding-and-aligning seat 5 may also clamp a plurality of lenses 40, which are for example but not limited to individually separated lenses 40 or lens array. In this way, the primary alignment between a plurality of LEDs 30 and a plurality of lenses 40 is achieved by using the alignment between the entire holding-and-aligning seat 50 and the first soldering pads 22*a*, 22*b* of substrate 20, which also reduce the number of the aligning elements 54*a*, 54*b*.

Figure 4:
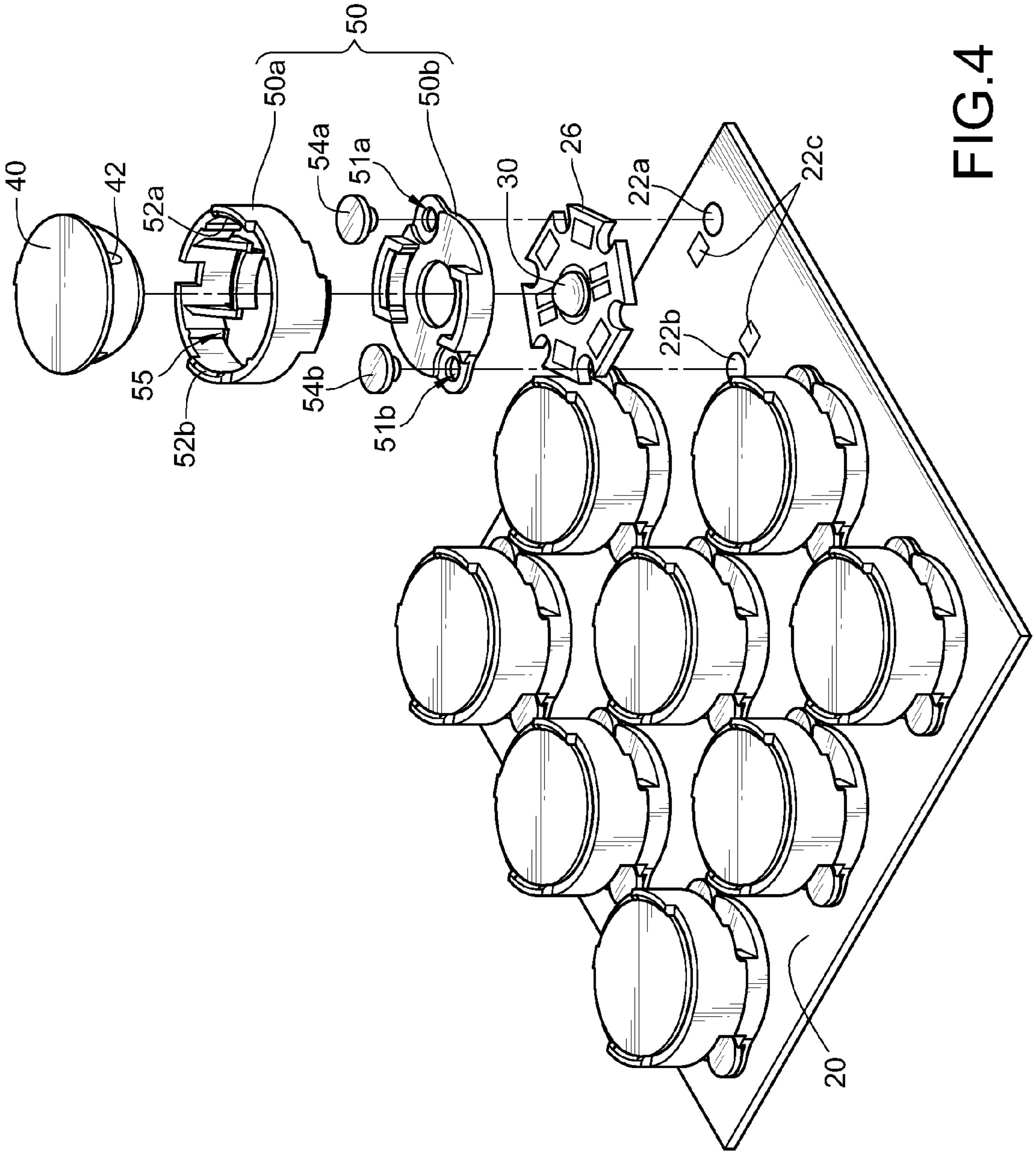
FIG. 4 is a schematic structural view of an LED light panel according to yet another embodiment of the present disclosure.

Furthermore, in the embodiment, the holding-and-aligning seat 50 adopts the single element design, but may also adopt the design of multiple elements. FIG. 4 is a schematic structural view of an LED light panel according to another embodiment of this disclosure. The LED light panel includes a substrate 20, an adapter plate 26, an LED 30, a lens 40 and a holding-and-aligning seat 50.

In this embodiment, the holding-and-aligning seat 50 includes a first housing 50*a* and second housing 50*b*. The LED 30 is disposed on the adapter plate 26 and then is bonded on this substrate 20. This design may also achieve the above precise alignment effect.

Figure 5:
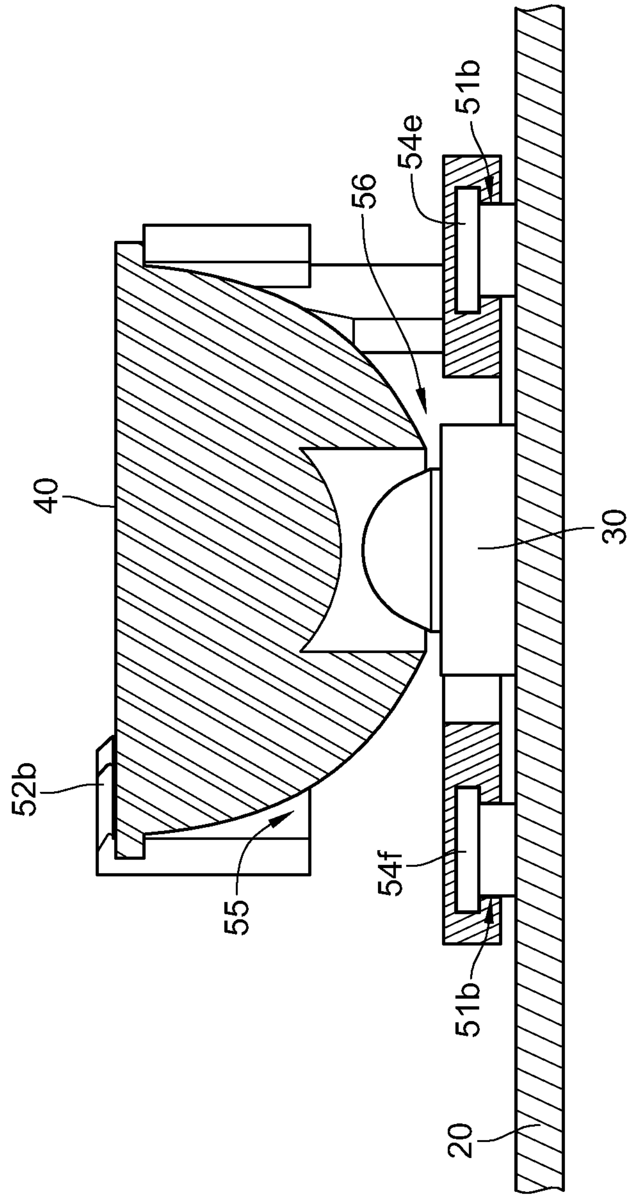
FIG. 5 is a schematic cross-sectional structural view of an LED light panel according to another embodiment of the present disclosure.

Then, FIG. 5 is a schematic cross-sectional structural view of an LED light panel according to another embodiment of the present disclosure. In FIG. 5, the LED light panel includes a substrate 20, an LED 30, a lens 40 and a holding-and-aligning seat 50.

In this embodiment, the aligning elements 54*e*, 54*f* of the holding-and-aligning seat 50 are fixed inside the holding-and-aligning seat 50, and the fixing manner includes fixing inside the seat when the holding-and-aligning seat 50 is injection molded. The design of fixing the aligning elements 54*e*, 54*f* on the holding-and-aligning seat 50 may achieve a better alignment effect.

In this embodiment, the material of the holding-and-aligning seat 50 is preferably the high temperature resistant material, and preferably the material that can resist the temperature of the reflow process, for example but not limited to resist the temperature of above 260°.

The aligning elements 54*e*, 54*f* of this embodiment adopt, but not limited to, the structure in the drawings, and may also be a plate-shaped element, and the exposed part of the plate-shaped element is soldered on the first soldering pads 22*a*, 22*b* respectively. The plate-shaped element may be the rectangular shape, and with the characteristic that the length and the width are not the same, the bonding orientation of the holding-and-aligning seat 50 is further aligned.

What is claimed is:

1. An LED light panel, comprising:

a substrate, having a plurality of soldering pads;

a LED, disposed on the substrate;

a lens; and a holding-and-aligning seat, having a holding portion and a plurality of aligning elements, wherein the holding portion clamps the lens, the aligning elements are soldered on the soldering pads correspondingly by a reflow process, such that the lens corresponds to the LED;

wherein the holding-and-aligning seat has a plurality of positioning holes, the aligning elements are respectively disposed on the positioning holes, a dimensional difference between a bottom area of each of the positioning holes and an outer diameter of the corresponding aligning element is smaller than or equal to a dimensional difference between the outer diameter of the aligning element and an outer diameter of the soldering pad of the corresponding aligning element.

2. The LED light panel according to claim 1, wherein a surface area of each soldering pad is 1 to 5 times of a bottom area of the corresponding aligning element.

3. The LED light panel according to claim 2, wherein the surface area of each soldering pad is 1.2 to 5 times of the bottom area of the corresponding aligning element.

4. The LED light panel according to claim 1, wherein each aligning element extends outwards in a conic shape upwardly from the bottom of the aligning element.

5. The LED light panel according to claim 1, wherein each aligning element comprising a stepped cylinder and a bottom area of the stepped cylinder is smaller than a top area of the stepped cylinder.

6. The LED light panel according to claim 1, wherein the bottom of the holding-and-aligning seat has a plurality of bumps, and one of the bumps touches a surface of the substrate when the holding-and-aligning seat is fixed on the substrate.

7. The LED light panel according to claim 1, wherein the holding-and-aligning seat has an accommodation space, the lens is disposed in the accommodation space, the holding-and-aligning seat has a passage for communicating the accommodation space and the LED and a part of the light emitted by the LED is incident on the lens after passing the accommodation space.

8. The LED light panel according to claim 1, wherein a surface area of each soldering pad is 1.2 to 5 times of the bottom area of the corresponding aligning element;

the bottom of the holding-and-aligning seat has a plurality of bumps and one of the bumps touches a surface of the substrate when the holding-and-aligning seat is fixed on the substrate; and the holding-and-aligning seat has an accommodation space, the lens is disposed in the accommodation space, the holding-and-aligning seat has a passage for communicating the accommodation space and the LED, and a part of the light emitted by the LED is incident on the lens after passing the accommodation space.

9. A lens-holding-and-aligning seat, applicable to clamping a lens and aligning the lens with an LED on a substrate, wherein the substrate has a plurality of soldering pads, the lens-holding-and-aligning seat comprising:

a body, having a holding portion and a plurality of aligning elements, wherein the holding portion clamps the lens, the aligning elements correspond to the soldering pads, such that the lens corresponds to the LED;

wherein the holding-and-aligning seat has a plurality of positioning holes, the aligning elements are disposed on the positioning holes, a dimensional difference between a bottom area of each of the positioning holes and an outer diameter of the corresponding aligning element is smaller than or equal to a dimensional difference between the outer diameter of the aligning element and an outer diameter of the soldering pad of the corresponding aligning element.

10. The lens-holding-and-aligning seat according to claim 9, wherein a surface area of each soldering pad is 1 to 5 times of a bottom area of the corresponding aligning element.

11. The lens-holding-and-aligning seat according to claim 10, wherein the surface area of each soldering pad is 1.2 to 5 times of the bottom area of the corresponding aligning element.

12. The lens-holding-and-aligning seat according to claim 9, wherein each aligning element extends outwards in a conic shape upwardly from the bottom of the aligning element.

13. The lens-holding-and-aligning seat according to claim 9, wherein each aligning element is a stepped cylinder and a bottom area of the stepped cylinder is smaller than a top area of the stepped cylinder.

14. The lens-holding-and-aligning seat according to claim 9, wherein the bottom of the holding-and-aligning seat has a plurality of bumps and one of the bumps touches a surface of the substrate when the holding-and-aligning seat is fixed on the substrate.

15. The lens-holding-and-aligning seat according to claim 9, wherein the holding-and-aligning seat has an accommodation space, the lens is disposed in the accommodation space, the lens-holding-and-aligning seat has a passage for communicating the accommodation space and the LED and a part of the light emitted by the LED is incident on the lens after passing the accommodation space.

16. The lens-holding-and-aligning seat according to claim 9, wherein a surface area of each soldering pad is 1.2 to 5 times of the bottom area of the corresponding aligning element;

the bottom of the holding-and-aligning seat has a plurality of bumps and one of the bumps touches a surface of the substrate when the holding-and-aligning seat is fixed on the substrate; and the holding-and-aligning seat has an accommodation space, the lens is disposed in the accommodation space, the lens-holding-and-aligning seat has a passage for communicating the accommodation space and the LED and a part of the light emitted by the LED is incident on the lens after passing the accommodation space.

* * * * *